(12) United States Patent
Miyazaki et al.

(10) Patent No.: US 8,376,063 B2
(45) Date of Patent: Feb. 19, 2013

(54) STRUCTURE FOR ATTACHING REAR WORK MACHINE TO TRACTOR

(75) Inventors: Eiji Miyazaki, Sakai (JP); Tsuyoshi Aoki, Sakai (JP)

(73) Assignee: Kubota Corporation, Osaka (JP)

( * ) Notice: Subject to any disclaimer, the term of this patent is extended or adjusted under 35 U.S.C. 154(b) by 124 days.

(21) Appl. No.: 12/724,958

(22) Filed: Mar. 16, 2010

(65) Prior Publication Data

US 2010/0300778 A1 Dec. 2, 2010

(30) Foreign Application Priority Data

Jun. 2, 2009 (JP) ................................. 2009-133092

(51) Int. Cl.
*A01B 51/00* (2006.01)
(52) U.S. Cl. ....................................... 172/272; 172/443
(58) Field of Classification Search .................. 172/272, 172/439, 275, 443; 37/231, 468
See application file for complete search history.

(56) References Cited

U.S. PATENT DOCUMENTS

| | | | | |
|---|---|---|---|---|
| 3,220,487 A | * | 11/1965 | Pilch | 172/274 |
| 3,495,727 A | * | 2/1970 | Long | 414/695.5 |
| 3,608,930 A | * | 9/1971 | Moriceau et al. | 280/456.1 |
| 4,034,998 A | * | 7/1977 | Iijima et al. | 280/461.1 |
| 4,039,095 A | * | 8/1977 | Long | 414/694 |
| 4,043,470 A | * | 8/1977 | Pilch | 414/686 |
| 4,111,319 A | * | 9/1978 | Matsuyoshi et al. | 414/686 |
| 4,279,566 A | * | 7/1981 | Sagaser et al. | 414/686 |
| 4,318,662 A | * | 3/1982 | Erickson et al. | 414/686 |
| 5,004,398 A | * | 4/1991 | Wagner et al. | 414/723 |
| 6,725,583 B2 | * | 4/2004 | Sprinkle et al. | 37/468 |
| 7,331,749 B2 | * | 2/2008 | Vachon | 414/694 |
| 7,877,906 B2 | * | 2/2011 | Ramun | 37/403 |
| 2007/0243052 A1 | | 10/2007 | Fukudome et al. | |
| 2008/0202779 A1 | | 8/2008 | Uchijima et al. | |

FOREIGN PATENT DOCUMENTS

| | | |
|---|---|---|
| JP | 2007261323 A | 10/2007 |
| JP | 2008201328 A | 9/2008 |

* cited by examiner

*Primary Examiner* — Jamie L McGowan
(74) *Attorney, Agent, or Firm* — The Webb Law Firm

(57) ABSTRACT

A structure for attaching a rear work machine to a tractor is provided. The tractor has a vehicle body which is provided with right and left rear work machine connection bodies, each having upper and lower connection portions. The rear work machine includes a base frame with an operator's seat, which is provided with right and left attaching plates, each having upper and lower engagement portions. The rear work machine can be attached to the tractor by connecting the upper and lower engagement portions to the upper and lower connection portions, respectively. The attaching structure includes: a rear work machine attaching spacer disposed between the rear work machine connection body and the corresponding attaching plate, the rear work machine attaching spacer including: a fixing portion for fixing to the attaching plate; and the upper and lower spacer engagement portions for removably connecting the upper and lower connection portions, respectively.

6 Claims, 12 Drawing Sheets

STRUCTURE FOR ATTACHING REAR WORK MACHINE TO TRACTOR

BACKGROUND OF THE INVENTION

1. Field of the Invention

The present invention relates to a structure for attaching a rear work machine to a tractor.

2. Description of the Related Art

As a rear work machine attaching structure, which is for attaching a rear work machine, such as backhoe, to the tractor, the following structure has been known. Specifically in this rear work machine attaching structure, a vehicle body of the tractor is provided on lateral sides thereof with a pair of right and left rear work machine connection bodies protruding rearward, each of which has an upper connection portion and a lower connection portion, while a base frame of the rear work machine is provided with a pair of right and left attaching plates, each of which has an upper engagement portion and a lower engagement portion. By respectively connecting the upper engagement portion and the lower engagement portion of the attaching plate to the upper connection portion and the lower connection portion of the corresponding attaching frame, the rear work machine is coupled to the tractor (see, for example, Japanese unexamined patent applications No. 2008-201328 and No. 2007-261323).

When a rear work machine, such as backhoe, is attached to the tractor having a cabin mounted on a rear portion of the tractor vehicle body, the following problem may arise. Specifically, since the cabin has a rear wall, it is difficult to make the orientation of the front-facing seat inside the cabin switchable to rear-facing, for the purpose of using the same seat also for an operation of the rear work machine. Accordingly, it is necessary to mount a separate operator's seat facing rearward on a front portion of the base frame of the rear work machine.

In order to prevent the rear wall of the cabin from interfering with the operator's seat for the rear work machine, it is necessary to attach the rear work machine, such as a backhoe, rearward away from the tractor vehicle body to a large degree, as compared with a case where the rear work machine is attached to a tractor having a ROPS or the like, instead of the cabin, in the rear portion of the tractor vehicle body. In this case, special members have been conventionally used as the right and left attaching plates each having the upper and lower engagement portions, which extend frontward to a large degree from the base frame of the rear work machine.

Therefore, conventionally, there has been a necessity to use the special attaching plate or the like in the rear work machine, such as backhoe, and thus the conventional rear work machine or the attaching plate thereof with the rear-facing operator's seat to be attached to the tractor with the ROPS or the like cannot be used as-is for the tractor with the cabin, resulting in poor cost efficiency. Accordingly, it would be desirable to provide a structure for attaching a rear work machine to a tractor that can solve the above-mentioned problem.

SUMMARY OF THE INVENTION

The present invention provides a structure for attaching a rear work machine a tractor, the tractor including: a tractor vehicle body; and a cabin mounted on a rear portion of the tractor vehicle body, the tractor vehicle body being provided with a pair of right and left rear work machine connection bodies protruding rearward, each of which has an upper connection portion and a lower connection portion, the rear work machine including: a base frame; and an operator's seat mounted on a front portion of the base frame, the base frame being provided with a pair of right and left attaching plates, each of which has an upper engagement portion and a lower engagement portion, and the rear work machine being configured to be attached to the tractor by respectively connecting the upper engagement portion and the lower engagement portion of the attaching plate to the upper connection portion and the lower connection portion of the corresponding rear work machine connection body, the structure including: a rear work machine attaching spacer disposed between the rear work machine connection body and the corresponding attaching plate, the rear work machine attaching spacer including: a fixing portion configured to be fixed to the attaching plate; an upper spacer engagement portion configured to be removably connected to the upper connection portion of the rear work machine connection body; and a lower spacer engagement portion configured to be removably connected to the lower connection portion of the rear work machine connection body.

In the configuration described above, it is preferable that, in the rear work machine attaching spacer, a positional relationship among the fixing portion, the upper spacer engagement portion and the lower spacer engagement portion is set so that, when the fixing portion is fixed to the attaching plate, the upper spacer engagement portion is positioned frontward of the upper engagement portion of the attaching plate, and at the same time the lower spacer engagement portion is positioned frontward of the lower engagement portion of the attaching plate.

In the configuration described above, it is preferable that the fixing portion in a form of a plate is overlapped with and fastened to the attaching plate with fastening means, the lower connection portion is shaped as a recess with an upward opening, the lower spacer engagement portion is formed of a connecting shaft configured to be removably engaged with the lower connection portion from above, in a manner similar to that for the lower engagement portion of the rear work machine, and the upper spacer engagement portion is formed of a boss into which a connecting pin can be inserted, in a manner similar to that for the upper engagement portion of the rear work machine, and the upper connection portion and the upper spacer engagement portion are removably connected to each other by the connecting pin inserted into the upper connection portion and the upper spacer engagement portion.

In the configuration described above, it is preferable that the fixing portion includes: an upper spacer connection portion positioned rearward of the upper spacer engagement portion; and a lower spacer connection portion positioned rearward of the lower spacer engagement portion, and the fixing portion is fixed to the attaching plate by connecting the upper spacer connection portion to the upper engagement portion of the attaching plate, and connecting the lower spacer connection portion to the lower engagement portion of the attaching plate.

According to the present invention, the spacer for attaching a rear work machine is disposed between the rear work machine connection body and the attaching plate. The spacer for attaching a rear work machine includes: the fixing portion configured to be fixed to the attaching plate; the upper spacer engagement portion configured to be removably connected to the upper connection portion of the rear work machine connection body; and the lower spacer engagement portion configured to be removably connected to the lower connection portion of the rear work machine connection body. Therefore, the conventional rear work machine or the attaching plate thereof configured to be attached to the tractor with no cabin can be used as-is, so that a rear work machine, such as backhoe, having a rear-facing operator's seat can be applied to a tractor having the cabin. As a result, there is no need to use a special attaching plate in the rear work machine, such as backhoe, and the backhoe or the attaching plate can be used as-is, leading to cost saving. Moreover, since the rear work machine attaching spacer is connected to the rear work machine connection body, the rear work machine connection body can be conveniently used as-is, and since the rear work machine attaching spacer is fixed to the attaching plate of the rear work machine, the attaching plate can be conveniently used as-is.

DETAILED DESCRIPTION OF THE PREFERRED EMBODIMENTS

Embodiments of the present invention will be described in detail with reference to the drawings.

Figure 1:
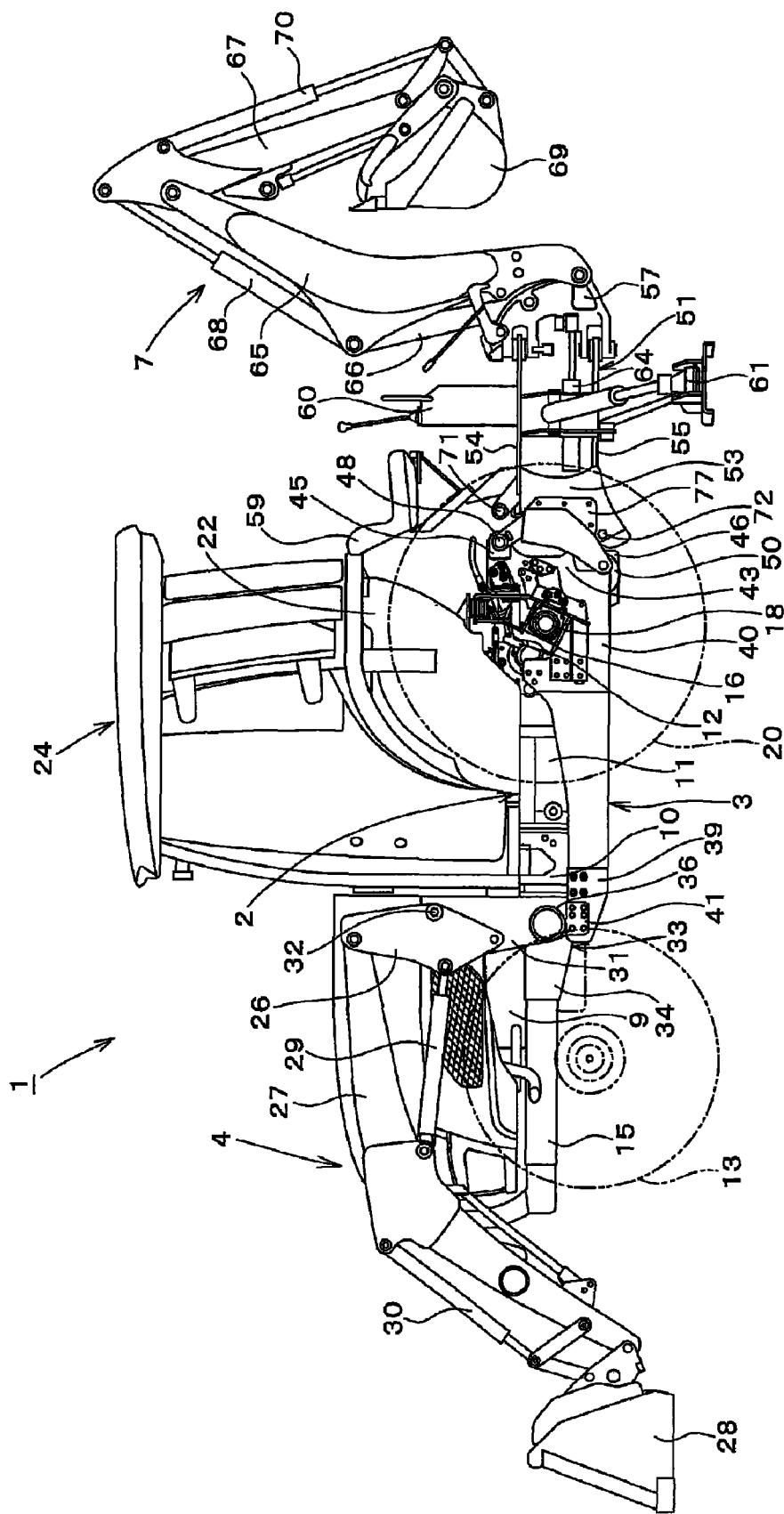
FIG. 1 is a side view of an entire work vehicle according to one embodiment of the present invention.

Referring to FIG. 1, a work vehicle 1 is what is called a tractor, front loader and backhoe (TLB). A tractor vehicle body 2 is reinforced with a pair of right and left attaching frames 3, and to a portion frontward of an intermediate portion of the frame 3, a front loader 4 as a front work machine is removably attached, while to a rear portion of the tractor vehicle body 2, a backhoe 7 as a rear work machine is removably attached.

The tractor vehicle body 2 includes an engine 9, a clutch housing 10, a connection case 11, and a transmission case 12, all connected in series in a front-rear direction. A front wheel frame 15 configured to suspend a front axle case of the front wheels 13 protrudes frontward from the engine 9, and a rear axle case 16 protrudes laterally outward from a rear portion of the transmission case 12. Rear wheels 20 are supported by a rear axle 18 protruding laterally outward from the rear axle case 16.

Though not shown, on an upper portion of the transmission case 12, a hydraulic power unit for elevating the work machine is mounted. When the work machine, such as rotary tiller, is attached instead of the backhoe (rear work machine) 7 to a rear portion of the tractor vehicle body 2, the work machine elevating hydraulic power unit lifts and lowers the work machine. Above the hydraulic power unit, a front-facing driver's seat and operation unit are provided, and from an area below the driver's seat to the operation unit, a floor sheet is provided, to whose lateral sides are attached rear wheel fenders 22. On the rear portion of the tractor vehicle body 2, a cabin 24 is mounted so as to surround the driver's seat and the operation unit.

The front loader (front work machine) includes a pair of right and left masts 26, a pair of right and left booms 27 and a bucket 28. A base portion of the boom 27 is supported vertically swingably by an upper portion of the corresponding mast 26, and the bucket 28 is pivotally supported by end portions of the right and left booms 27 in such a manner that the bucket 28 can perform scooping and dumping. The boom 27 is configured to be actuated hydraulically by a boom cylinder 29, and the bucket 28 is configured to be actuated hydraulically by a bucket cylinder 30.

The mast 26 is fitted from above into a mast receiving member 31 of a front loader attaching body 33 to thereby engage a lower portion of the mast 26 with the mast receiving member 31, and an intermediate portion of the mast 26 is locked to the mast receiving member 31 with a lock pin 32. Accordingly, the front loader 4 not in use can be removed from the attaching body 33 by pulling out the lock pin 32.

In addition to the mast receiving member 31, the attaching body 33 includes a pair of right and left mounting members 34 and a support tube 36. The pair of right and left mounting members 34 are attached to members forming the tractor vehicle body 2, such as the engine 9 and the clutch housing 10, the support tube 36 is protruding laterally outward from the mounting member 34, and the mast receiving member 31 is protruding upward from the support tube 36.

The attaching frame 3 is formed of a pair of right and left plates whose thickness is oriented in a lateral direction, and longwise arranged in the front-rear direction on the corresponding right and left lateral sides of the tractor vehicle body 2. Each of the right and left attaching frames 3 has a front attaching portion 39 and a rear attaching portion 40, with the former being connected and fixed by bolts or the like to a bracket 41 or the like of the attaching body 33 for attaching the front loader 4, and the latter being fixed to the tractor vehicle body 2 by bolts or the like, in the vicinity of the rear axle 18.

Rearward of the rear attaching portion 40 of each of the right and left attaching frames 3, a rear work machine connection body 43 is provided. The rear work machine connection body 43 has an upper connection portion 45 and a lower connection portion 46, protruding rearward from the tractor vehicle body 2.

Figure 2:
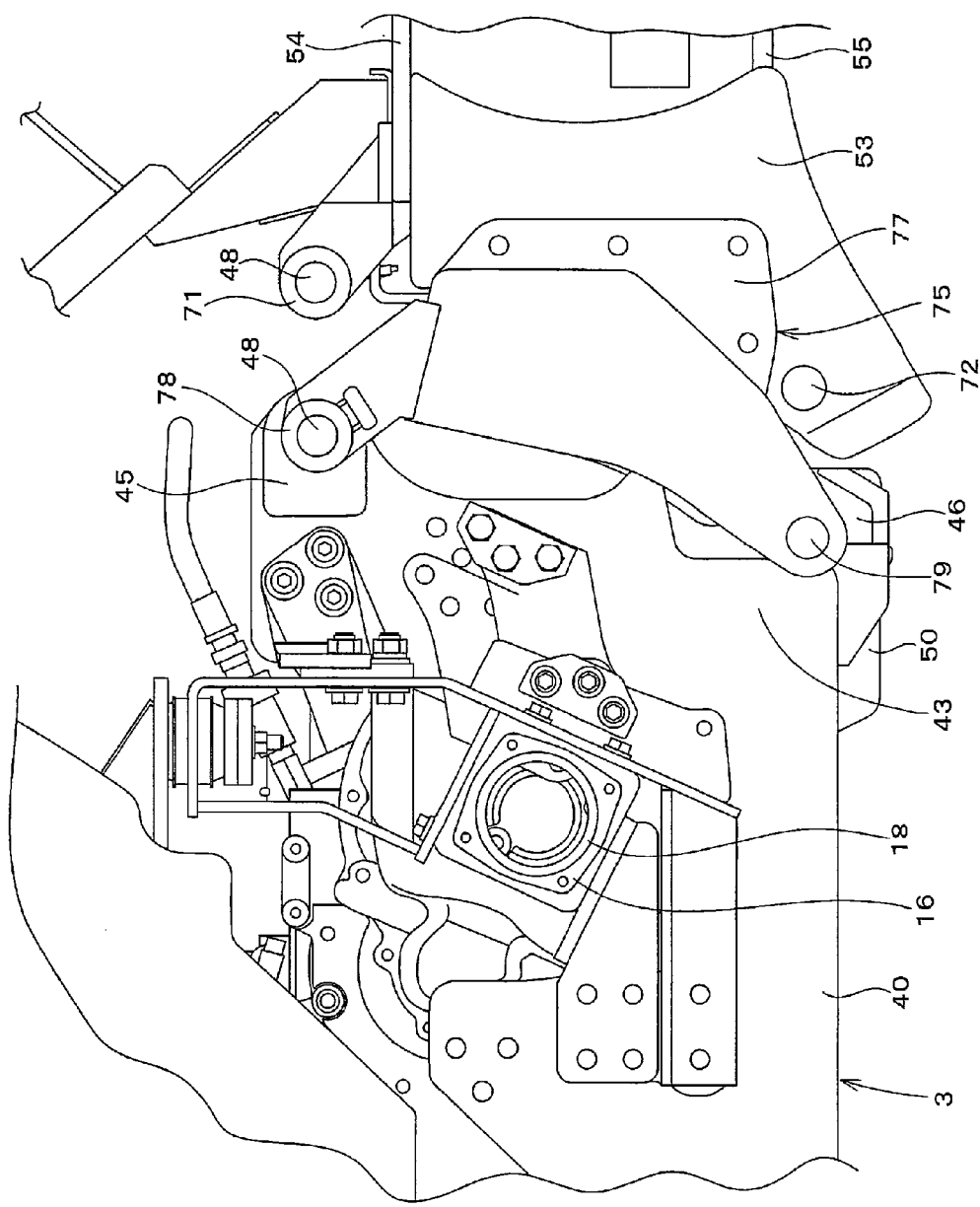
FIG. 2 is a side view of a portion around a spacer for attaching a rear work machine.
Figure 3:
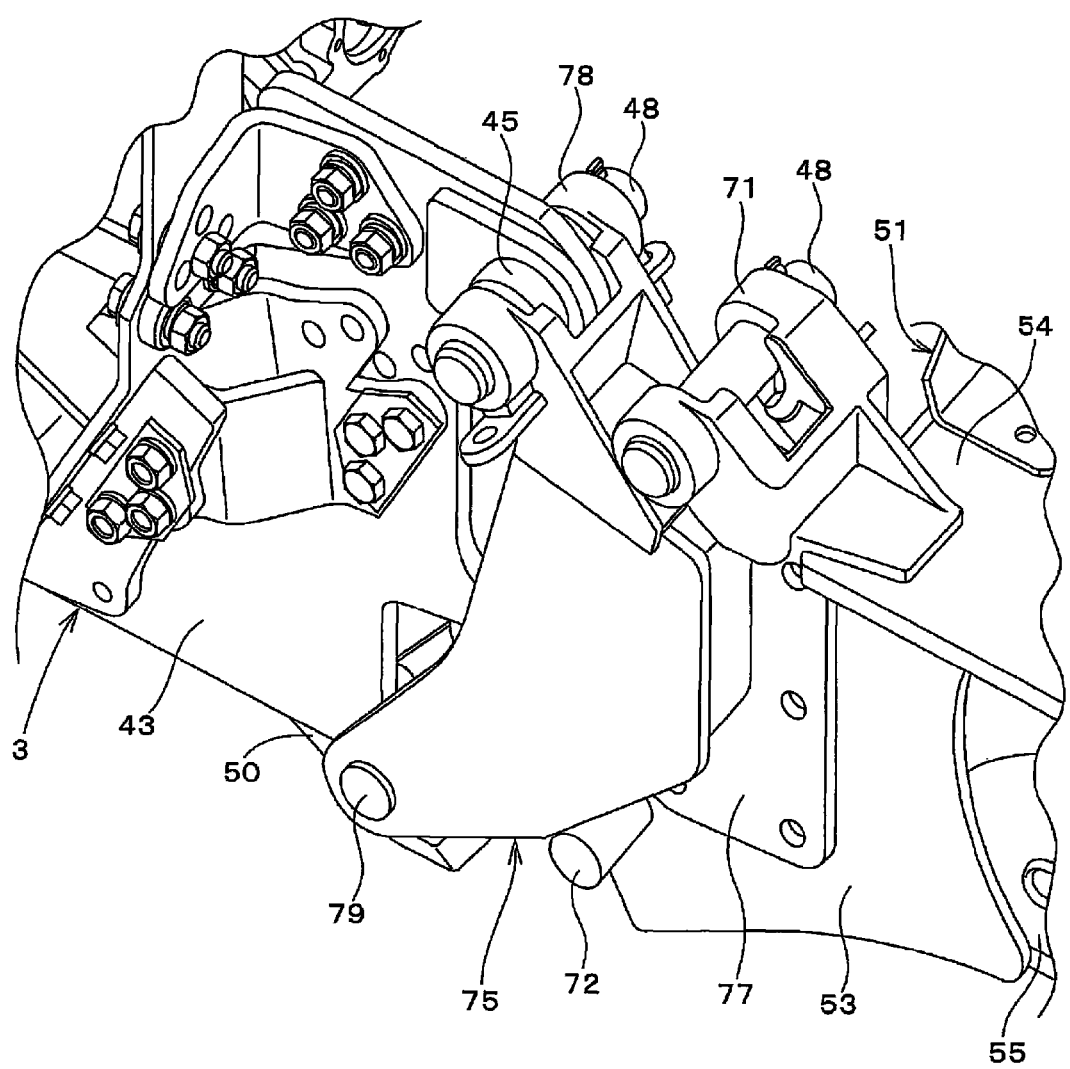
FIG. 3 is a perspective view of the portion around the spacer for attaching a rear work machine.
Figure 4:
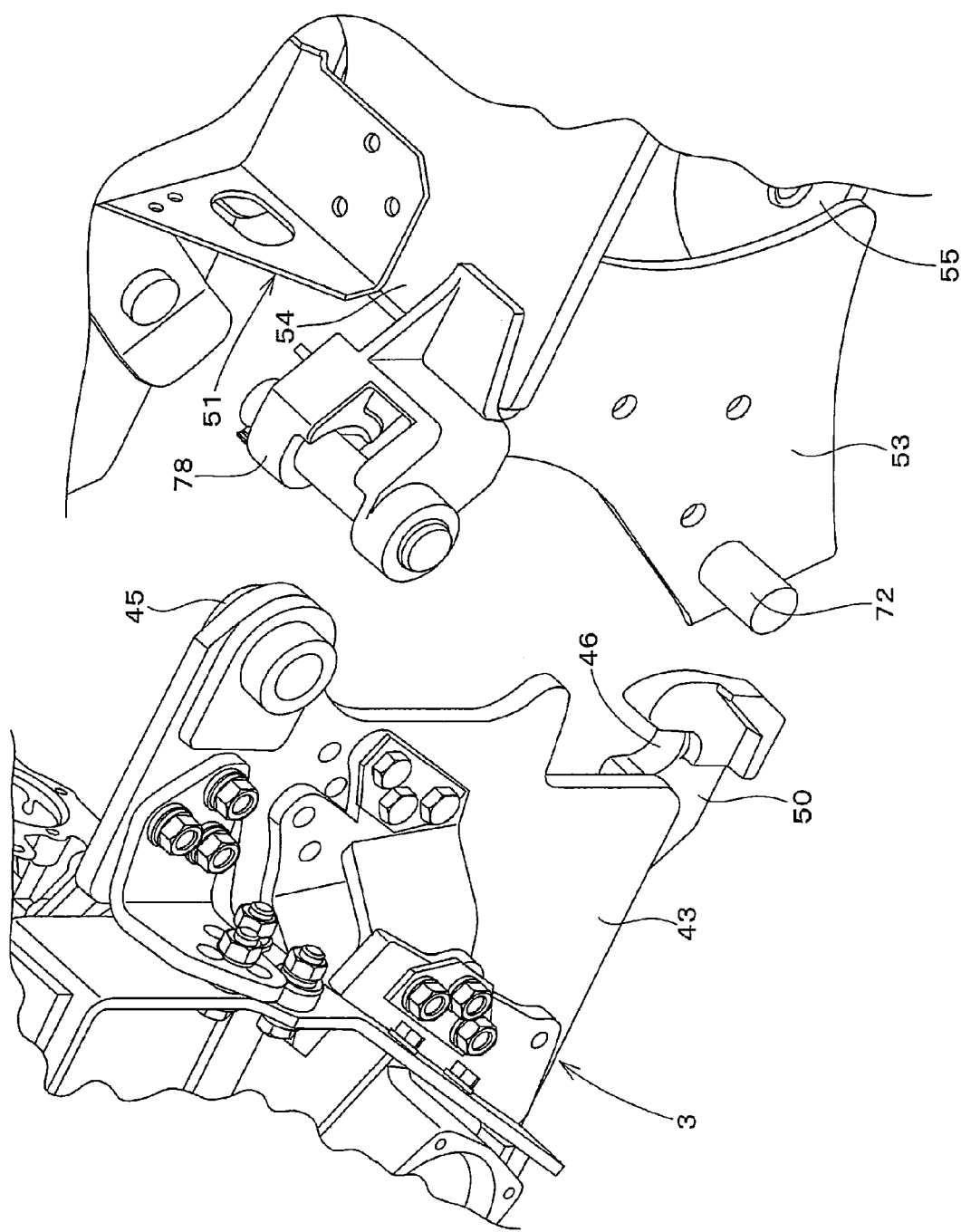
FIG. 4 is a perspective view in which the spacer for attaching a rear work machine is removed.
Figure 5:
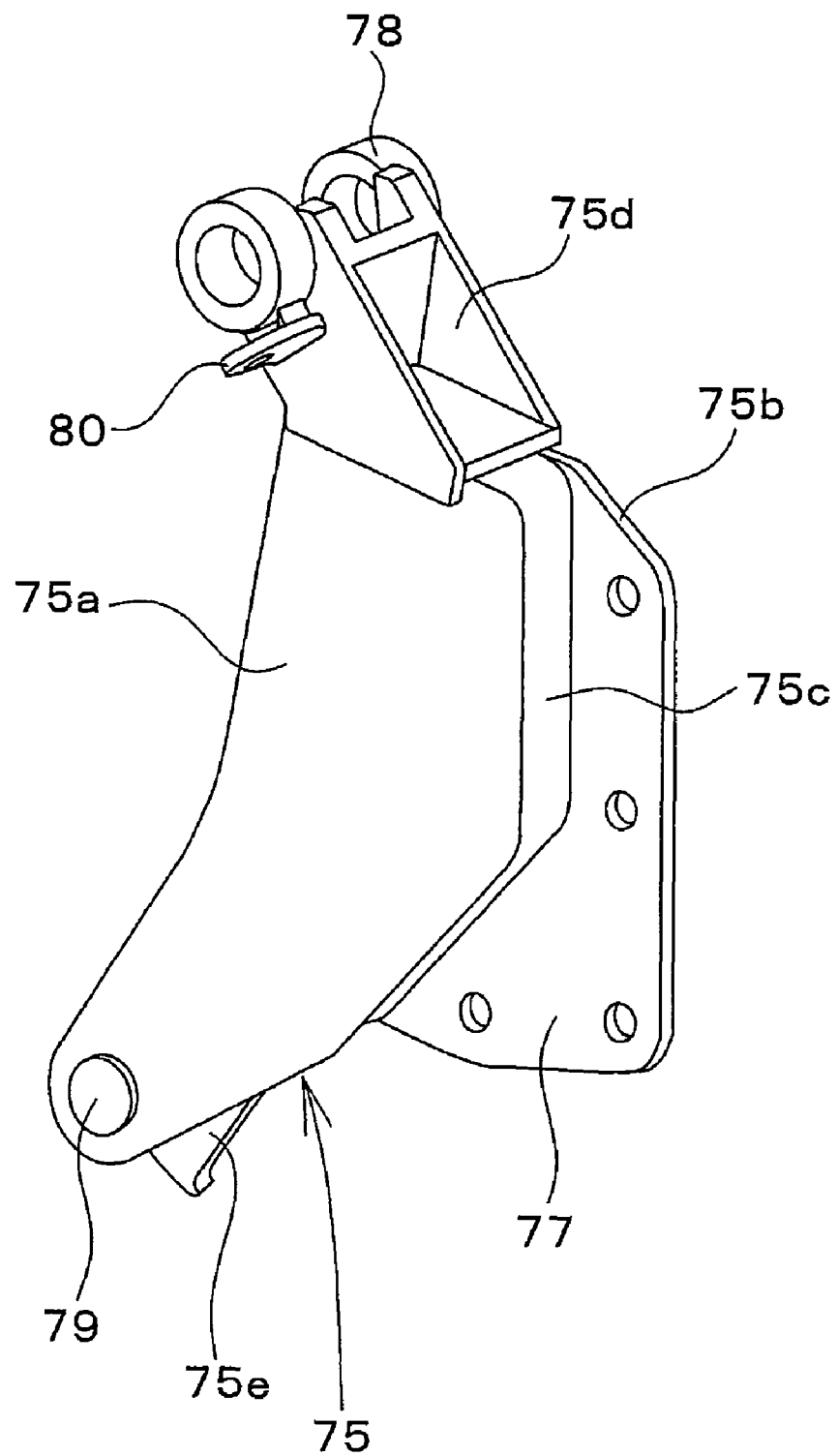
FIG. 5 is a perspective view of the spacer for attaching a rear work machine.
Figure 6:
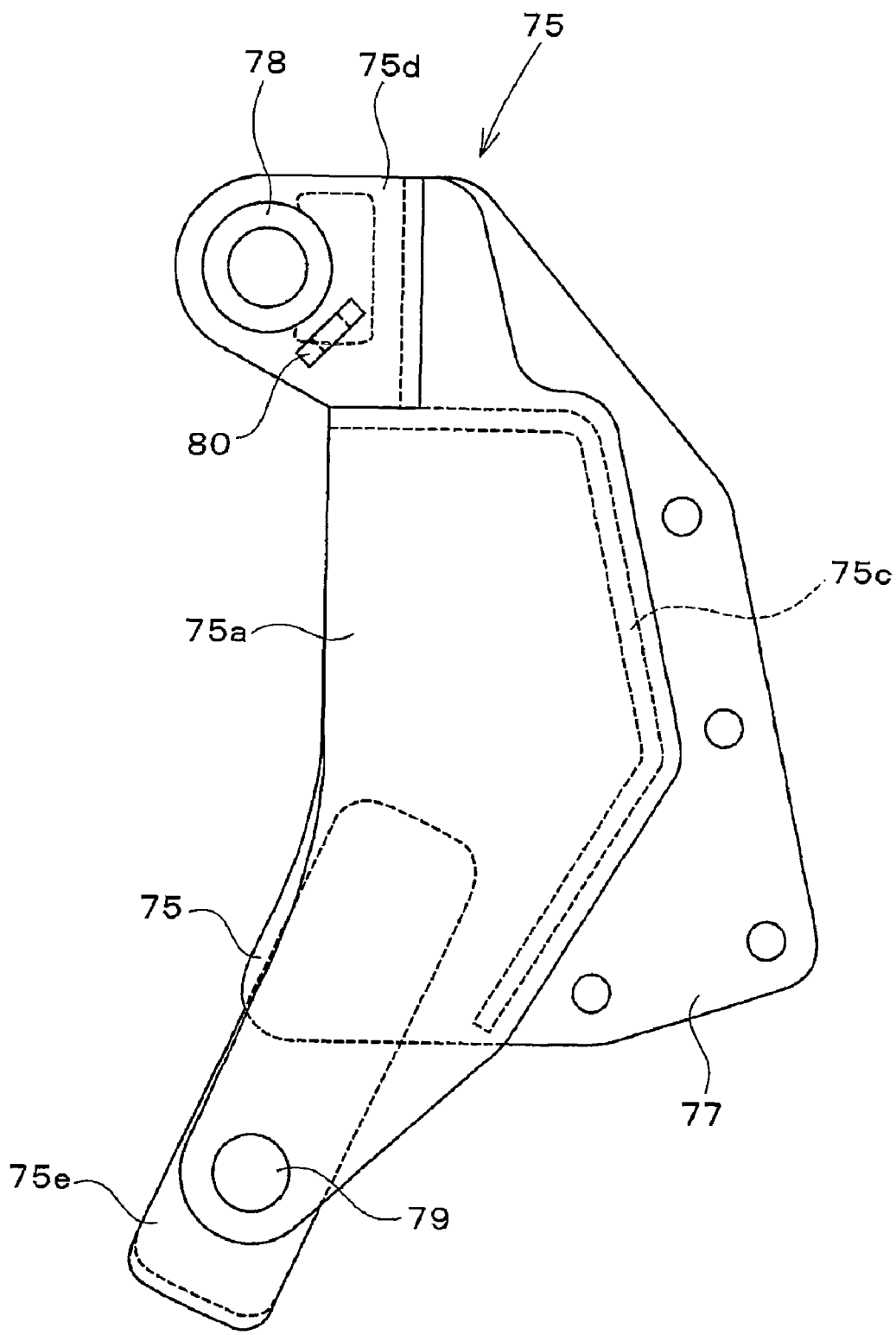
FIG. 6 is a side view of the spacer for attaching a rear work machine.
Figure 7:
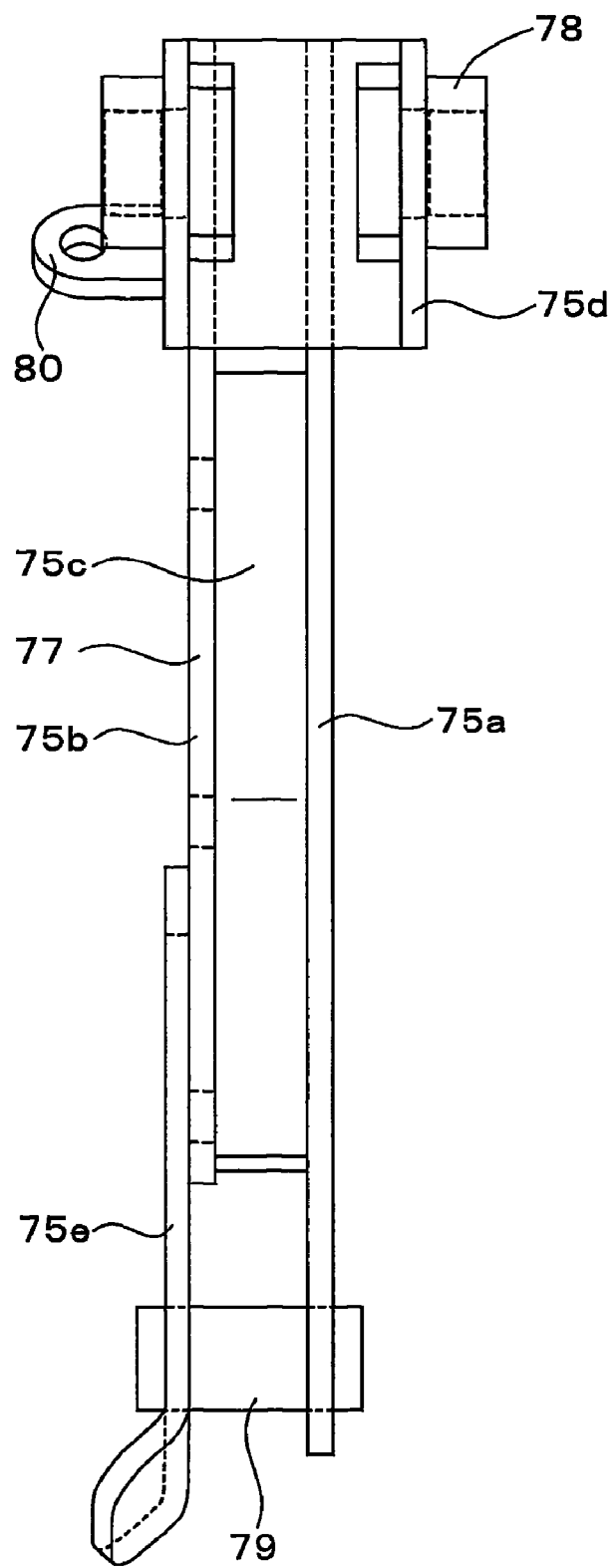
FIG. 7 is a front view of the spacer for attaching a rear work machine.
Figure 8:
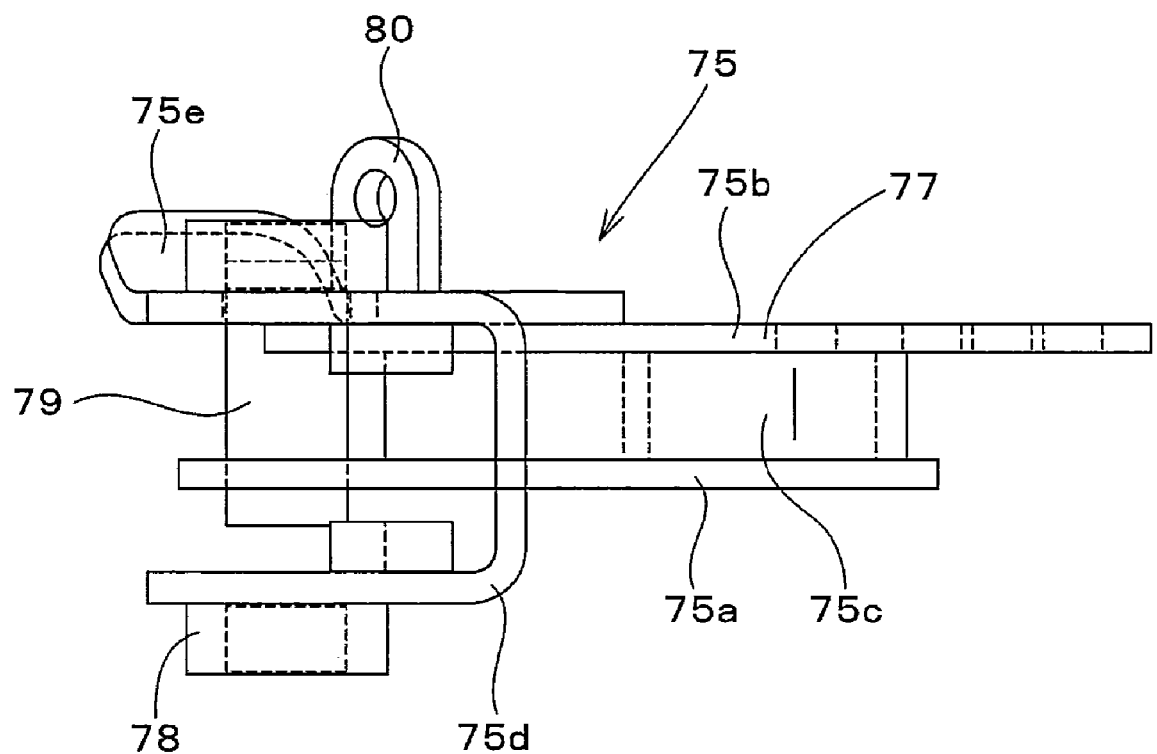
FIG. 8 is a plan view of the spacer for attaching a rear work machine.
Figure 9:
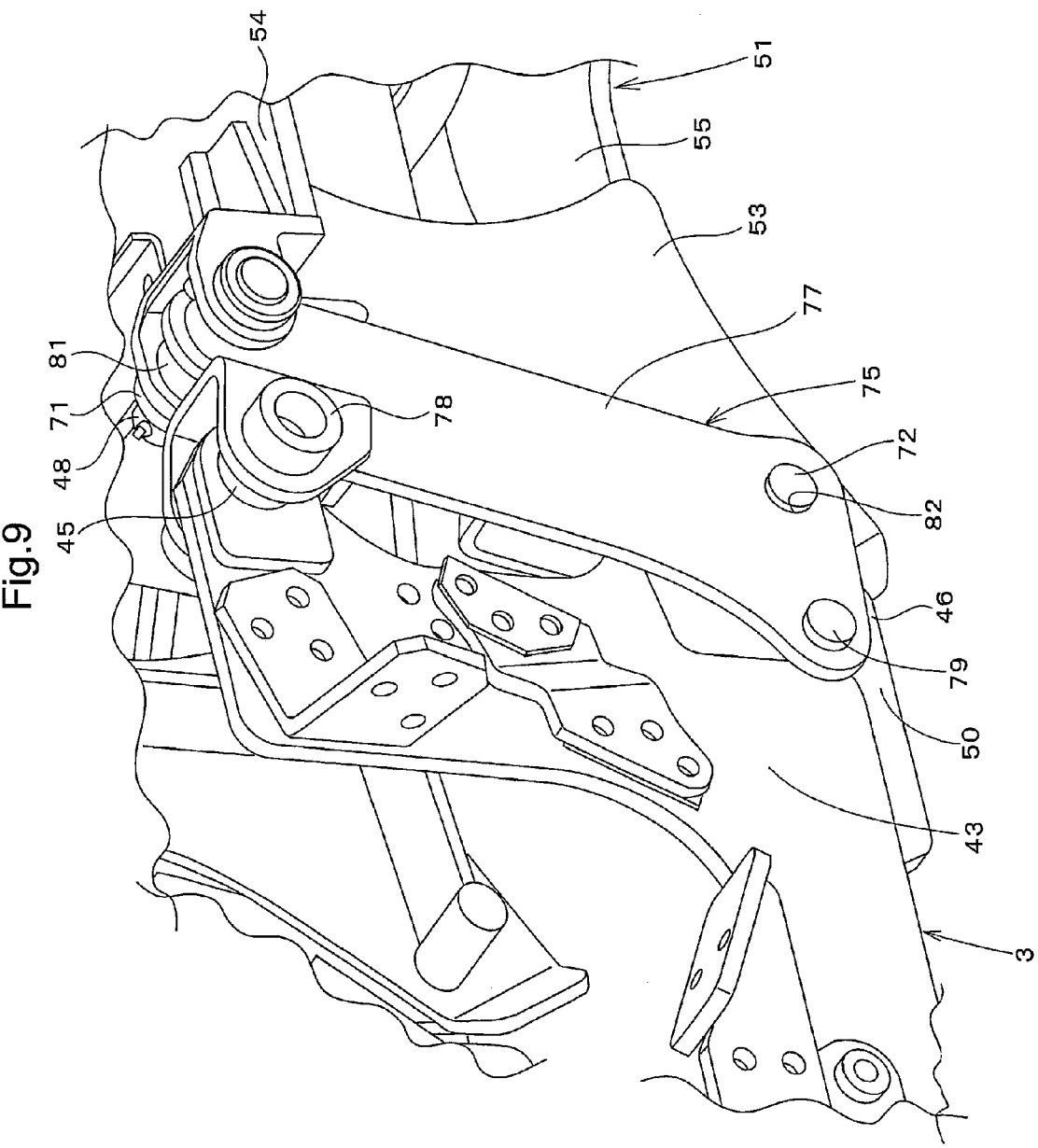
FIG. 9 is a perspective view of a portion around a spacer for attaching a rear work machine according to another embodiment of the present invention.
Figure 10:
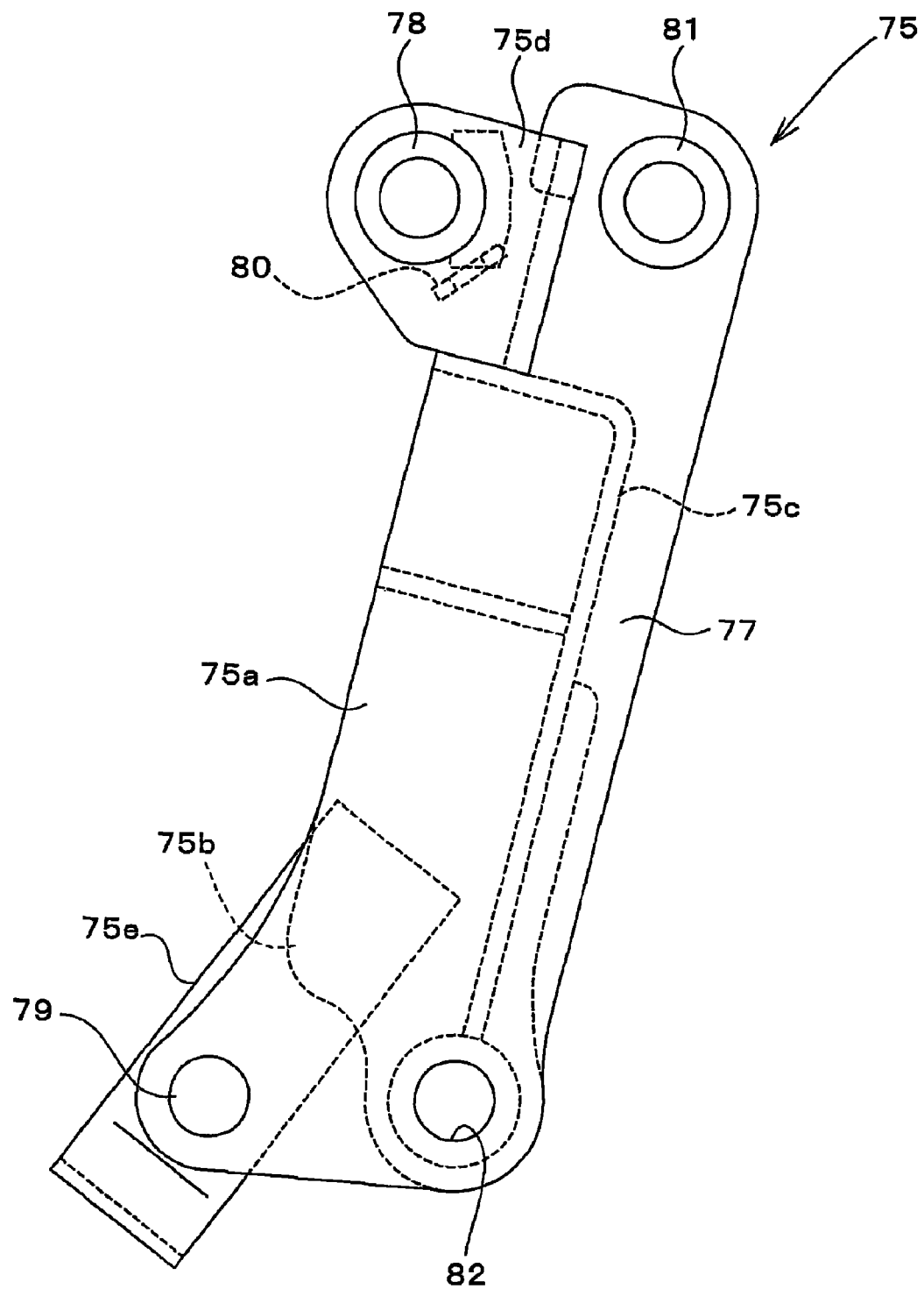
FIG. 10 is a side view of the spacer for attaching a rear work machine.
Figure 11:
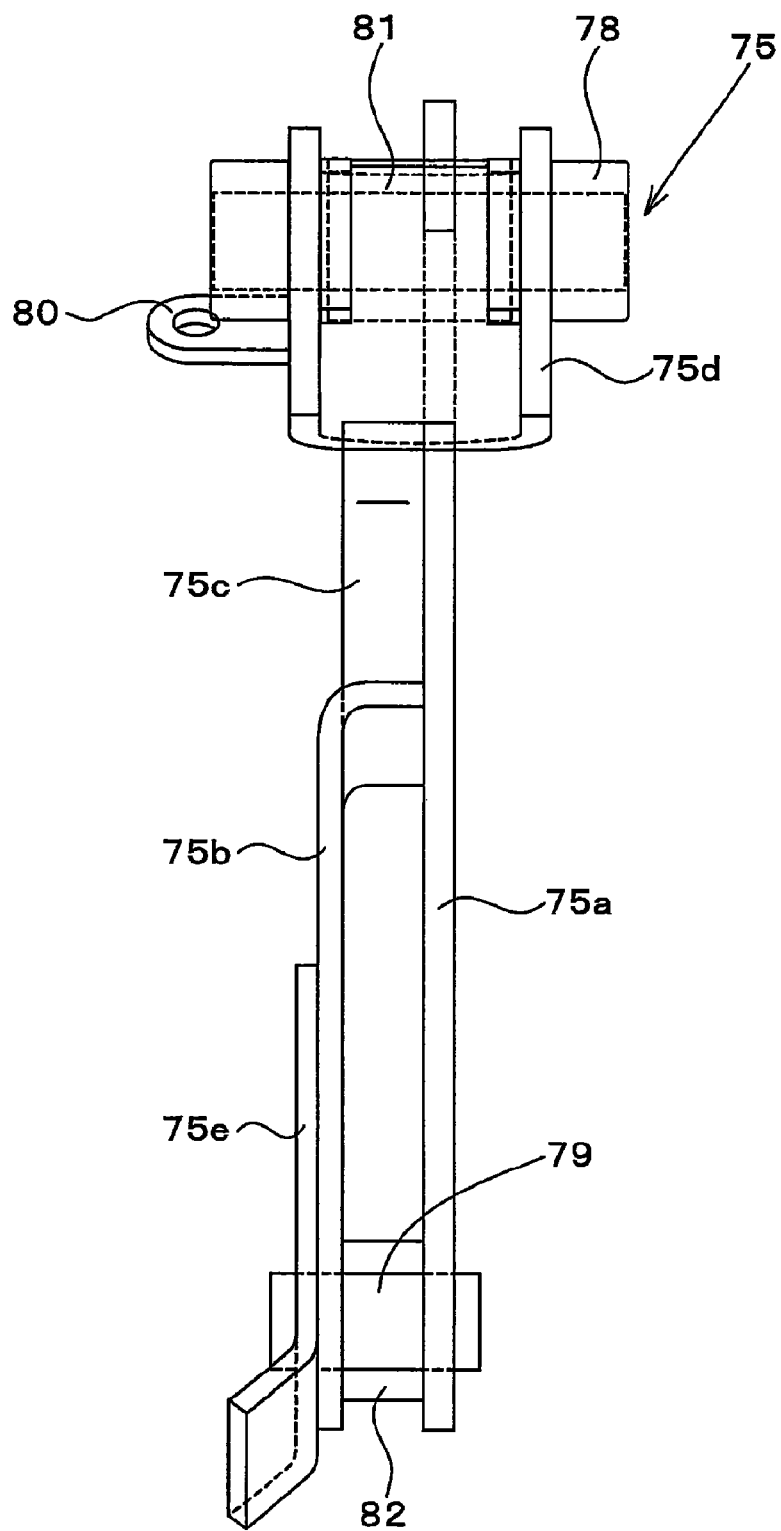
FIG. 11 is a front view of the spacer for attaching a rear work machine.
Figure 12:
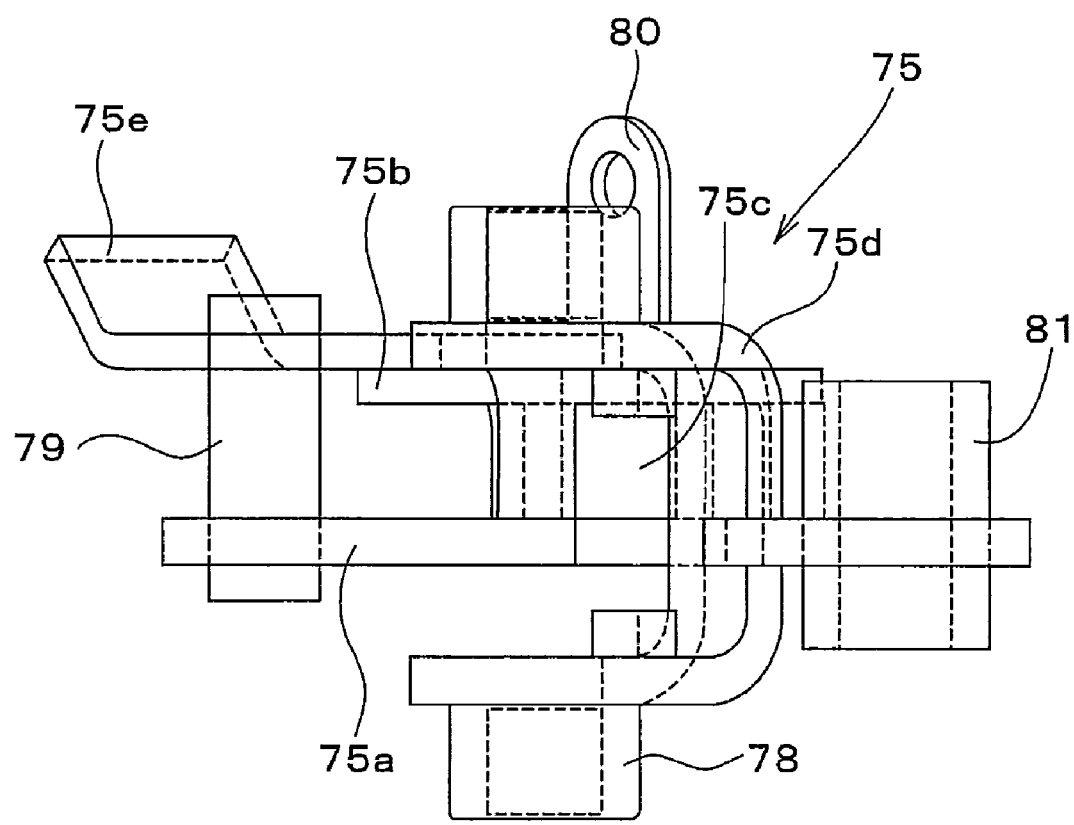
FIG. 12 is a plan view of the spacer for attaching a rear work machine.

As shown in FIGS. 2-4, the upper connection portion 45 is formed of a boss having an insertion hole, provided in a rear upper portion of the attaching frame 3, into which a connecting pin 48 can be inserted. To a rear lower portion of the attaching frame 3 is fixed a receiving member 50 having a recess with an upward opening, providing the lower connection portion 46.

Referring to FIGS. 1-4, the backhoe (rear work machine) 7 includes: a pair of right and left attaching plates 53 vertically standing frontward of a base frame 51; a top panel 54 which is connected to upper end portions of the right and left attaching plates 53 and serves as a step oriented rearward; and a lower plate 55 connected to lower end portions of the right and left attaching plates 53. By a rear portion of the base frame 51, a swing bracket 57 is supported swingably about a vertical shaft. On a front portion of the top panel 54, a rear-facing operator's seat 59 is provided and an operating device 60 is mounted rearward of the operator's seat 59. On right and left sides of the base frame 51, outriggers (stabilizers) 61 hydraulically driven are provided.

The swing bracket 57 is laterally swingable by a single swing cylinder 64, and by the swing bracket 57, base portions of a boom 65 and boom cylinder 66 are pivotally supported. The boom 65 is vertically swingable by the boom cylinder 66. An arm 67 is pivotally supported by an end portion of the boom 65 and is vertically swingable by an arm cylinder 68. A bucket 69 is pivotally supported by an end portion of the arm 67 with a bucket cylinder 70 in such a manner that the bucket 69 can perform scooping and dumping.

As shown in FIGS. 2-4, in upper and lower portions of each of the pair of right and left attaching plates 53 of the backhoe 7, there are provided an upper engagement portion 71 and a lower engagement portion 72, which are removably connected to the upper connection portion 45 and the lower connection portion 46, respectively, of the corresponding rear work machine connection body 43 in a rear end portion of the attaching frame 3. With this configuration, the backhoe 7 can be attached to and removed from the tractor vehicle body 2.

The upper engagement portion 71 is formed of a member having a squared U-shape as seen from above, which is fixed to both the attaching plate 53 and the top panel 54 by welding and has a boss with an insertion hole. By concentrically arranging the insertion holes of the upper engagement portion 71 and the upper connection portion 45 and inserting the connecting pin 48 thereinto, the upper engagement portion 71 and the upper connection portion 45 can be connected.

The lower engagement portion 72 is formed of a connecting shaft penetrating through and fixed to the attaching plate 53, and configured to be removably engaged with the lower connection portion 46 from above. For connection, first the lower engagement portion 72 is engaged with the lower connection portion 46, the base frame 51 is rotated about the lower engagement portion 72, the upper engagement portion 71 and the upper connection portion 45 are faced to each other (the insertion holes are concentrically arranged), and then the connecting pin 48 is inserted into the through holes.

Between the right (left) rear work machine connection body 43 and the right (left) attaching plate 53, a right (left) spacer 75 for attaching the rear work machine is disposed. Each of the rear work machine attaching spacers 75 includes: a fixing portion 77 configured to be fixed to the attaching plate 53; an upper spacer engagement portion 78 configured to be removably connected to the upper connection portion 45 of the rear work machine connection body 43; and a lower spacer engagement portion 79 configured to be removably connected to the lower connection portion 46 of the rear work machine connection body 43.

More specifically, as shown in FIGS. 5-8, the rear work machine attaching spacer 75 includes: an outer plate 75a; an inner plate 75b; a connection body 75c connecting the plates 75a,75b; a support 75d in a squared U-shape fixed to upper end portions of the plates 75a,75b; and a lower support plate 75e protruding from the inner plate 75b. A rear portion of the inner plate 75b is shaped into a plate which serves as the fixing portion 77. The support 75d is provided with the upper spacer engagement portion 78 which is formed of a boss into which the connecting pin 48 can be inserted, like the upper engagement portion 71. The lower spacer engagement portion 79 is provided between the outer plate 75a and the lower support plate 75e at lower end portions thereof, and is formed of a connecting shaft configured to be removably engaged with the lower connection portion 46, like the lower engagement portion 72 of the backhoe 7.

The fixing portion 77 is overlapped with and removably fastened to the attaching plate 53 with fastening means, such as bolts. The upper connection portion 45 and the upper spacer engagement portion 78 are arranged in such a manner that the insertion holes thereof are contiguously aligned, into which the connecting pin 48 is inserted. In this manner, the upper connection portion 45 and the upper spacer engagement portion 78 are removably connected to each other. The lower spacer engagement portion 79 is removably engaged with the lower connection portion 46 from above.

A positional relationship among the fixing portion 77, the upper spacer engagement portion 78 and the lower spacer engagement portion 79 are set in such a manner that, when the fixing portion 77 is fixed to the attaching plate 53, the upper spacer engagement portion 78 is positioned frontward of the upper engagement portion 71 of the attaching plate 53, and at the same time the lower spacer engagement portion 79 is positioned frontward of the lower engagement portion 72 of the attaching plate 53.

It should be noted that the support 75d of the rear work machine attaching spacer 75 is provided with a pin holding portion 80 configured to engage with a retaining pin inserted into an end portion of the connecting pin 48.

According to the above-described embodiment, the rear work machine attaching spacer 75 disposed between the rear work machine connection body 43 on a tractor vehicle body 2 side and the attaching plate 53 on a backhoe 7 side has: the fixing portion 77 configured to be fixed to the attaching plate 53; the upper spacer engagement portion 78 configured to be removably connected to the upper connection portion 45 of the rear work machine connection body 43; the lower spacer engagement portion 79 configured to be removably connected to the lower connection portion 46 of the rear work machine connection body 43. When the fixing portion 77 is fixed to the attaching plate 53, the upper spacer engagement portion 78 is positioned frontward of the upper engagement portion 71 of the attaching plate 53, and at the same time the lower spacer engagement portion 79 is positioned frontward of the lower engagement portion of the attaching plate 53. Therefore, by connecting the upper spacer engagement portion 78 of the rear work machine attaching spacer 75 fixed to the attaching plate 53 to the upper connection portion 45 of the rear work machine connection body 43, and at the same time by connecting the lower spacer engagement portion 79 of the rear work machine attaching spacer 75 fixed to the attaching plate 53 to the lower connection portion 46 of the rear work machine connection body 43, the attaching position of the backhoe 7 can be make much rearward relative to the tractor as compared with a case where the backhoe 7 is attached to the tractor vehicle body 2 by directly connecting the attaching plate 53 of the backhoe 7 to the rear work machine connection body 43 of the tractor vehicle body 2. Accordingly, even when the cabin 24 is mounted on the tractor and the rear-facing operator's seat 59 is mounted on the backhoe 7, the cabin 24 is prevented from being interfered with the operator's seat 59. Therefore, the conventional backhoe 7 or the attaching plate 53 thereof configured to be attached to the tractor having a ROPS or the like instead of the cabin 24 can be used as-is, and the rear work machine, such as the backhoe 7, having the rear-facing operator's seat 59 can be applied to the tractor having the cabin 24. As a result, there is no need to use a special attaching plate 53 in the rear work machine, such as the backhoe 7, and the backhoe 7 or the attaching plate 53 can be used as-is, leading to cost saving. Moreover, since the rear work machine attaching spacer 75 is connected to the rear work machine connection body 43, the upper connection portion 45 and the lower connection portion 46 of the rear work machine connection body 43 can be conveniently used as-is, and since the rear work machine attaching spacer 75 is fixed to the attaching plate 53 of the rear work machine, the attaching plate 53 can be conveniently used as-is.

FIGS. 9 to 12 show another embodiment of the present invention, in which the right (left) rear work machine attaching spacers 75 between the right (left) rear work machine connection body 43 and the right (left) attaching plate 53 includes: the fixing portion 77 configured to be fixed to the attaching plate 53; the upper spacer engagement portion 78 configured to be removably connected to the upper connection portion 45 of the rear work machine connection body 43; and the lower spacer engagement portion 79 configured to be removably connected to the lower connection portion 46 of the rear work machine connection body 43. The fixing portion 77 of the rear work machine attaching spacer 75 includes: an upper spacer connection portion 81 positioned rearward of the upper spacer engagement portion 78; and a lower spacer connection portion 82 positioned rearward of the lower spacer engagement portion 79.

More specifically, the rear work machine attaching spacer 75 includes: the outer plate 75a; the inner plate 75b; the connection body 75c connecting the plates 75a,75b; the support 75d in a squared U-shape fixed to the upper end portions of the plates 75a,75b; and the lower support plate 75e protruding from the inner plate 75b. Each of the rear portions of the outer plate 75a and the inner plate 75b is shaped into a plate which serves as the fixing portion 77. The support 75d is provided with the upper spacer engagement portion 78 which is formed of a boss into which the connecting pin 48 can be inserted, like the upper engagement portion 71. The lower spacer engagement portion 79 is provided between the outer plate 75a and the lower support plate 75e at lower end portions thereof, and is formed of a connecting shaft configured to be removably engageable with the lower connection portion 46, like the lower engagement portion 72 of the backhoe 7.

A rear upper portion of the outer plate 75a is provided with the upper spacer connection portion 81 which is formed of a boss having an insertion hole into which the connecting pin 48 can be inserted, like the upper connection portion 45 of the rear work machine connection body 43. The lower spacer connection portion 82 is provided between the plates 75a,75b at lower rear end portions thereof, and is formed of a boss having an insertion hole into which the lower engagement portion (shaft portion) 72 of the attaching plate 53 can be inserted. The lower engagement portion 72 of the attaching plate 53 is configured to be removably connected to the upper spacer connection portion 81, through the insertion of the lower engagement portion 72 into the lower spacer connection portion 82. In addition, the fixing portion 77 is configured to be removably fixed to the attaching plate 53, through the connection of the upper engagement portion 71 of the attaching plate 53 to the upper spacer connection portion 81 as well as the connection of the lower engagement portion 72 of the attaching plate 53 to the lower spacer connection portion 82.

Other features are the same as those in the embodiment described above, and likewise, the conventional backhoe 7 or the attaching plate 53 thereof configured to be attached to the tractor having a ROPS or the like instead of the cabin 24 can be used as-is, and the rear work machine, such as the backhoe 7, having the rear-facing operator's seat 59 can be applied to the tractor having the cabin 24. As a result, there is no need to use a special attaching plate 53 in the rear work machine, such as the backhoe 7, and the backhoe 7 or the attaching plate 53 can be used as-is, leading to cost saving. Moreover, since the rear work machine attaching spacer 75 is connected to the rear work machine connection body 43, the rear work machine connection body 43 can be conveniently used as-is, and since the rear work machine attaching spacer 75 is fixed to the attaching plate 53 of the rear work machine, the attaching plate 53 can be conveniently used as-is.

It should be noted that, in the embodiments described above, the present invention is applied to the work vehicle called a tractor-front loader-backhoe (TLB). However, the work vehicle to which the present invention can be applied is not limited to the TLB, and alternatively, it is applicable to a work vehicle in which the tractor vehicle body has only a backhoe attached to a rear portion, or to a work vehicle in which a rear work machine other than the backhoe is attached to a rear portion of the tractor vehicle body.

What is claimed is:

1. A tractor comprising:
a tractor vehicle body; and a cabin mounted on a rear portion of the tractor vehicle body, the tractor vehicle body being provided with a pair of right and left rear work machine connection bodies protruding rearward, each of which has an upper connection portion and a lower connection portion;
a rear work machine comprising: a base frame; and an operator's seat mounted on a front portion of the base frame, the base frame being provided with a pair of right and left attaching plates, each of which has an upper engagement portion and a lower engagement portion, and the rear work machine being configured to be attached to the tractor by respectively connecting the upper engagement portion and the lower engagement portion of the attaching plate to the upper connection portion and the lower connection portion of the corresponding rear work machine connection body; and
a structure for attaching the rear work machine to the tractor, the structure comprising: a rear work machine attaching spacer disposed between the rear work machine connection body and the corresponding attaching plate, the rear work machine attaching spacer comprising:
a fixing portion shaped into a plate configured to be fixed to the attaching plate;
an upper spacer engagement portion configured to be removably connected to the upper connection portion of the rear work machine connection body; and
a lower spacer engagement portion configured to be removably connected to the lower connection portion of the rear work machine connection body,
wherein the upper spacer engagement portion is shaped substantially identical to the upper engagement portion, and the lower spacer engagement portion is shaped substantially identical to the lower engagement portion; and
wherein the plate-shaped fixing portion is fixed to the attaching plate in plane-contact with each other between the upper engagement portion and the lower engagement portion.

2. The tractor according to claim 1, wherein
in the rear work machine attaching spacer, a positional relationship among the fixing portion, the upper spacer engagement portion and the lower spacer engagement portion is set so that, when the fixing portion is fixed to the attaching plate, the upper spacer engagement portion is positioned frontward of the upper engagement portion of the attaching plate, and at the same time the lower spacer engagement portion is positioned frontward of the lower engagement portion of the attaching plate.

3. The tractor according to claim 1, wherein the fixing portion in a form of a plate is overlapped with and fastened to the attaching plate with fastening means, the lower connection portion is shaped as a recess with an upward opening, the lower spacer engagement portion is formed of a connecting shaft configured to be removably engaged with the lower connection portion from above, in a manner similar to that for the lower engagement portion of the rear work machine, and the upper spacer engagement portion is formed of a boss into which a connecting pin can be inserted, in a manner similar to that for the upper engagement portion of the rear work machine, and the upper connection portion and the upper spacer engagement portion are removably connected to each other by the connecting pin inserted into the upper connection portion and the upper spacer engagement portion.

4. The tractor according to claim 1, wherein the fixing portion comprises: an upper spacer connection portion positioned rearward of the upper spacer engagement portion; and a lower spacer connection portion positioned rearward of the lower spacer engagement portion, and the fixing portion is fixed to the attaching plate by connecting the upper spacer connection portion to the upper engagement portion of the attaching plate, and connecting the lower spacer connection portion to the lower engagement portion of the attaching plate.

5. The tractor according to claim 1, wherein the upper spacer engagement portion is provided at a substantially same level with the upper engagement portion, and the lower spacer engagement portion is provided at a substantially same level with the lower engagement portion.

6. The tractor according to claim 1, wherein the fixing portion is fixed to the attaching plate with bolts.

* * * * *